(12) United States Patent
Park et al.

(10) Patent No.: US 9,686,835 B2
(45) Date of Patent: Jun. 20, 2017

(54) FLUORESCENT LAMP-COMPATIBLE LED LIGHTING DEVICE AND ELECTRIC SHOCK PROTECTION APPARATUS THEREFOR

(71) Applicant: SOFTKERNEL CO., LTD., Gyeonggi-do (KR)

(72) Inventors: Kwang Youn Park, Seoul (KR); Sang Heon Lee, Gyeonggi-do (KR); Jae Heung Park, Incheon (KR); Jung Ryul Kim, Seoul (KR); Sung Woo Park, Gyeonggi-do (KR)

(73) Assignee: SOFTKERNEL CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/127,321

(22) PCT Filed: Mar. 17, 2015

(86) PCT No.: PCT/KR2015/002596
§ 371 (c)(1),
(2) Date: Sep. 19, 2016

(87) PCT Pub. No.: WO2015/142042
PCT Pub. Date: Sep. 24, 2015

(65) Prior Publication Data
US 2017/0142787 A1    May 18, 2017

(30) Foreign Application Priority Data

Mar. 17, 2014   (KR) .......... 10-2014-0031113
Mar. 17, 2015   (KR) .......... 10-2015-0037113

(51) Int. Cl.
*H05B 33/00*    (2006.01)
*H05B 33/08*    (2006.01)
(Continued)

(52) U.S. Cl.
CPC ....... *H05B 33/089* (2013.01); *H05B 33/0815* (2013.01); *F21K 9/278* (2016.08); *F21Y 2115/10* (2016.08)

(58) Field of Classification Search
CPC .... G03G 15/30; G03G 21/14; G03G 15/2039; G03G 15/80; H05B 41/28;
(Continued)

(56) References Cited

U.S. PATENT DOCUMENTS

2011/0228526 A1    9/2011   Hartikka et al.

FOREIGN PATENT DOCUMENTS

JP    2004296205    10/2004
JP    2011165634    5/2011
(Continued)

*Primary Examiner* — Monica C King
(74) *Attorney, Agent, or Firm* — IPLA P.A.; James E. Bame

(57) ABSTRACT

A fluorescent lamp-compatible LED lighting device which is used to a fluorescent lamp apparatus and includes a ballast stabilizer which applies a first discharge voltage when first and second coupling terminals of the fluorescent lamp are all connected to the fluorescent lamp apparatus and also applies second discharge voltage when first coupling terminal or second coupling terminal is connected to the fluorescent lamp apparatus, the fluorescent lamp-compatible LED light device comprising; first and second coupling members electrically connected to sockets of both sides of the fluorescent lamp apparatus, an electric shock protecting device selectively connected to the first coupling member or the second coupling member, a rectifying member for rectifying the outside alternating power source inputted through the first and second coupling members, an LED module having plural LEDs, and a driving member for driving the LED module based on the driving power source supplied from the rectifying member.

16 Claims, 5 Drawing Sheets

(51) Int. Cl.
  *F21K 9/278* (2016.01)
  *F21Y 115/10* (2016.01)
(58) Field of Classification Search
  CPC ............ H05B 41/2985; H05B 41/2988; H05B 41/3921; H05B 41/3925; H02H 11/001; H02H 1/003; H02H 3/162
  See application file for complete search history.

(56) References Cited

FOREIGN PATENT DOCUMENTS

| | | |
|---|---|---|
| KR | 20120124756 | 11/2012 |
| KR | 20140026732 | 3/2014 |

FLUORESCENT LAMP-COMPATIBLE LED LIGHTING DEVICE AND ELECTRIC SHOCK PROTECTION APPARATUS THEREFOR

BACKGROUND

The present invention relates to a fluorescent lamp-compatible LED (Light Emitting Diode) lighting device and an electric shock protection apparatus therefor which can use by replacing the existing fluorescent lamp, and more particularly, a fluorescent lamp-compatible LED (Light Emitting Diode) lighting device and an electric shock protecting apparatus therefor which can prevent an electric shock accident from generating during a process that an LED light device is separated from an fluorescent lamp apparatus or fixed to it.

BACKGROUND ART

Recently, the interest on a lighting device or an lighting system using an LED (Light Emitting Diode) has increased dramatically. An LED lighting device has an advantage that power consumption might be less and its life is semi-permanent compared to a fluorescent lamp, an incandescent lamp, and a halogen lamp which have been previously used.

FIG. 1 is a construction view illustrating a construction of a fluorescent lamp apparatus which has been used at present. The fluorescent lamp consists of sockets 2 and 3 for combining them with fluorescent lamps, a ballast stabilizer 4, and a glow switch 5, and alternating current power source 1 is coupled to this construction through a power switch 6.

A first terminal pin 11 and a second terminal pin 12, as a first coupling member, are installed at a side of a fluorescent lamp 10, and a third terminal pin 13 and a fourth terminal pin 14, as a second coupling member, installed at another side of the fluorescent lamp 10. The terminal pins 13 and 14 are inserted into the sockets 2 and 3 to be electrically coupled with the fluorescent lamp apparatus. And, filaments 15 and 16 for the discharge operation of the fluorescent lamps are coupled between the first and second terminal pins 11 and 12, and the third and fourth terminal pins 13 and 14.

In the fluorescent lamp apparatus, when fluorescent lamps are combined with the sockets 2 and 3 and the power switch 6 is turned on, the alternating current power source 1 flows through the ballast stabilizer 4 and the glow switch 5. When a fixed electrode and a movable electrode are separated and thus a glow switch 5 is turned off, the instantaneous high voltage generated between both end terminals of the ballast stabilizer 4 is applied to filaments 15 and 16. By this high voltage, discharge is generated between filaments 15 and 16, so that the fluorescent lamp 10 is turned on. And, after being turned on the fluorescent lamp 10, the stable current flow between filaments 15 and 16 is achieved.

FIG. 2 is a block construction view illustrating a construction of a fluorescent lamp-compatible LED lighting device 20. The fluorescent lamp-compatible LED lighting device 20 consists of a first coupling member, that is, first and second terminal pins 21 and 22, coupled with a socket 2 of a fluorescent lamp apparatus like a general fluorescent lamp, and a second coupling member, that is, third and fourth terminal pins 23 and 24. The distance between the first coupling member 21 and 22 and the second coupling member 23 and 24 is set identically to a general fluorescent lamp. Rectifying members 25 and 26 are electrically coupled with the first coupling member 21 and 22 and the second coupling member 23 and 24. The rectifying members 25 and 26, for example, consist of a bridge diode. The rectifying members 25 and 26 rectify alternating current inputted through the first to fourth terminals pins 21 to 24 and then supply it to a driving member 28.

Plural LEDs are equipped with an LED module 27 and these LEDs, which were not specifically displayed, are arrayed along the longitudinal direction of an LED light device. The driving member 28 drives the LED module 27 by driving power applied from the rectifying members 25 and 26.

However, there are several problems in the conventional LED light device 20 as follows.

Generally, due to lifetime of a fluorescent lamp, a replacing work is required every certain period. In general, a lot of replacing works of a fluorescent lamp are performed in the state that a power switch 6 is turned on. It is because a worker can confirm the lighting state of the fluorescent lamp, simultaneously replacing it.

At the fluorescent lamp of FIG. 1, when a worker installs a fluorescent lamp 10 or a fluorescent lamp-compatible LED light device 20 to a fluorescent lamp apparatus newly, side terminal pins of the fluorescent lamp are firstly combined with side sockets of the fluorescent lamp apparatus and thereafter other terminal pins thereof combined with other sockets of the fluorescent lamp apparatus.

However, in most of ballast stabilizers 4 adapted to the present fluorescent lamp apparatus, in a case that the power switch 6 is turned on, although terminal pins of a fluorescent lamp are coupled with only one of sockets 2 or 3, all terminal pins thereof are not coupled with both sockets 2 and 3, the ballast stabilizer 4 recognizes that a fluorescent lamp is combined with the fluorescent lamp apparatus. That is, the ballast stabilizer 4 recognizes that when terminal pins are not coupled with another socket 2 or 3, it is recognized as an off-state of the glow switch 5 and then high voltage is applied continuously to the fluorescent lamp 10 or 20.

In the conventional fluorescent lamp 10, current flow between filaments 5 and 6 is not formed until discharge is generated and the fluorescent lamp 10 is being lighted. Accordingly, although high voltage is applied to side terminal pins of the fluorescent lamp 10, any voltage fluctuation does not occurred to other terminal pins.

However, in the fluorescent lamp-compatible LED lighting device 10, inside circuits mostly consists of semiconductor devices or electronic devices. Since these components generally have the parasite capacitance, when power source is applied from the outside, the leakage current become flow in the non-operation state though. Accordingly, in the fluorescent lamp-compatible LED light device 20, there is a disadvantage that when high voltage is applied to a side terminal pin(s), the high voltage is transmitted to another terminal pin(s), so that a worker be got an electric shock accident.

DISCLOSURE

Summary of the Invention

In consideration of the above-described problems of the prior art, it is an object of the present invention to provide a fluorescent lamp-compatible LED (Light Emitting Diode) lighting device in which an electric shock accident of a worker is prevented fundamentally.

Another object of the present invention is to provide an electric shock protecting device for a fluorescent lamp-compatible LED (Light Emitting Diode) lighting device in which in a state that all the first and second coupling members of the LED light device are not coupled with sockets of the fluorescent lamp apparatus, the terminal pins and an inner circuit are cut off electrically, thereby preventing an electric shock accident of a worker from generating.

TECHNICAL SOLUTION

In order to accomplish the above objects, according to an aspect of the present invention, there is provided a fluorescent lamp-compatible LED (Light Emitting Device) lighting device which is used to a fluorescent lamp apparatus and includes a ballast stabilizer which applies a first discharge voltage when first and second coupling terminals of the fluorescent lamp are all connected to the fluorescent lamp apparatus and also applies second discharge voltage when first coupling terminal or second coupling terminal is connected to the fluorescent lamp apparatus, the fluorescent lamp-compatible LED light device comprising;

first and second coupling members electrically connected to sockets of both sides of the fluorescent lamp apparatus, an electric shock protecting device selectively connected to the first coupling member or the second coupling member, a rectifying member for rectifying the outside alternating power source inputted through the first and second coupling members, an LED module having plural LEDs, and a driving member for driving the LED module based on the driving power source supplied from the rectifying member, wherein the electric shock protecting device electrically connects the first coupling member or the second coupling member to an inside circuit when the first discharge voltage is applied from the fluorescent lamp apparatus, and sets the first coupling member or the second coupling member as open state to the inside circuit when the second discharge voltage is applied from the fluorescent lamp apparatus.

According to the present invention having the above-described configuration, a fluorescent lamp-compatible LED (Light Emitting Diode) lighting device and an electric shock protecting apparatus discriminates whether the fluorescent lamp-compatible LED lighting device is normally installed to the fluorescent lamp apparatus on the basis of the discharge voltage applied from the ballast stabilizer of the fluorescent lamp apparatus. And, an electric shock accident of a worker is prevented by cutting off applying of high voltage from the ballast stabilizer to the LED lighting device at a working state that the LED lighting device is combined with the fluorescent lamp apparatus.

DETAILED DESCRIPTION OF THE INVENTION

Figure 1:
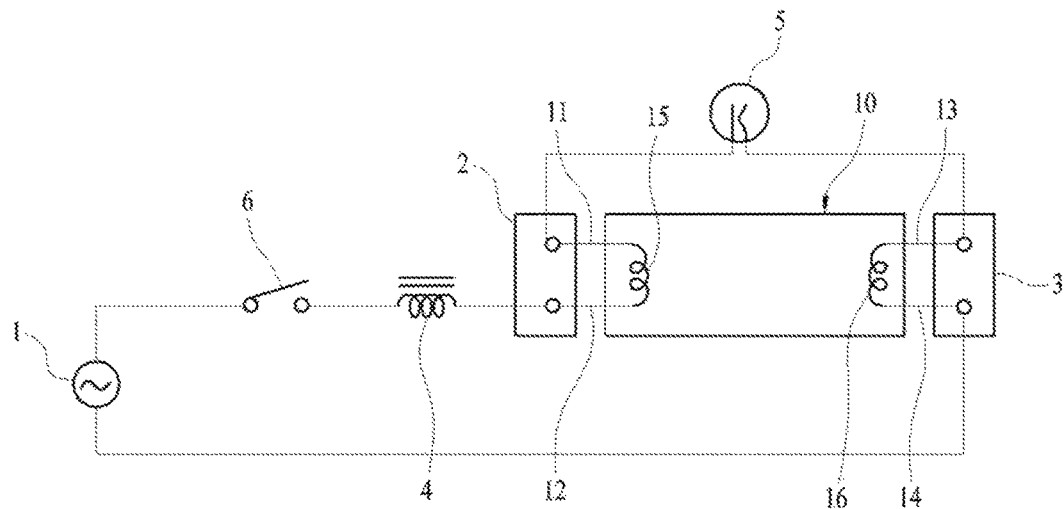
FIG. 1 is a construction view illustrating a construction of a general fluorescent lamp apparatus.

To achieve the above objects, in the first aspect of the present invention, a fluorescent lamp-compatible LED (Light Emitting Device) lighting device which is used to a fluorescent lamp apparatus and includes a ballast stabilizer which applies a first discharge voltage when first and second coupling terminals of the fluorescent lamp are all connected to the fluorescent lamp apparatus and also applies second discharge voltage when first coupling terminal or second coupling terminal is connected to the fluorescent lamp apparatus, the fluorescent lamp-compatible LED light device comprising;

first and second coupling members electrically connected to sockets of both sides of the fluorescent lamp apparatus, an electric shock protecting device selectively connected to the first coupling member or the second coupling member, a rectifying member for rectifying the outside alternating power source inputted through the first and second coupling members, an LED module having plural LEDs, and a driving member for driving the LED module based on the driving power source supplied from the rectifying member, wherein the electric shock protecting device electrically connects the first coupling member or the second coupling member to an inside circuit when the first discharge voltage is applied from the fluorescent lamp apparatus, and sets the first coupling member or the second coupling member as open state to the inside circuit when the second discharge voltage is applied from the fluorescent lamp apparatus.

Also, wherein the electric shock protecting device comprises:

a first switch for switching electrical connection between the first coupling terminal or the second coupling terminal and the inside circuit, a first detecting member for turning on or off the first switch according to the first and second discharge voltage from the first or second coupling terminals, and a first switching driving member connected to output side of the first switch and for maintaining ON state of the first switch when current is supplied to the inside circuit through the first switch.

Also, the first switch comprises triac.

Also, the first detecting member comprises two or more neon lamps which are connected in series.

Also, the first switching driving member comprises a first bridge circuit connected in parallel to the detecting member, a first photo coupler installed at the current path of the first bridge circuit, and a second bridge circuit electrically connected between the first switch and the inside circuit and for turning on and off the first photo coupler.

Also, the electric shock protecting device comprises second and third switches installed in series to the current path between the first or second coupling member and the inside circuit, second and third detecting members connected in series to the first or second coupling terminals and for turning on and off the second and third switches respectively according to the first and second discharge voltage applied from the first or second coupling terminals, and a switching driving member connected to output side of the second switch and for maintaining ON state of the second and third switches when current is supplied to the inside circuit through the second switch.

Also, the second and third switches comprise triac.

Also, the second and third detecting members comprise two or more neon lamps which are connected in series.

Also, the second switching driving member comprises third and fourth bridge circuits connected in parallel respectively to the second and third detecting members, second and third photo couplers installed at the current path of the third and fourth bridge circuits, and a fifth bridge circuit electrically connected between the second switch and the inside circuit and for turning on and off the second and third photo couplers.

In the second aspect of the present invention, an electric shock protecting device which is used to a fluorescent lamp-compatible LED (Light Emitting Diode) lighting device having first and second coupling members connected to a fluorescent lamp apparatus, a power source member for producing driving power source by using the outside power source being inputted from the first and second coupling members, an LED module having plural LEDs, and a driving member for driving the LED module by using the driving power source of the power source member, the electric shock protecting device is installed between the first or second coupling members and the power source member, wherein the electric shock protecting device comprises:

a switch for switching electrical connection between the first coupling terminal or the second coupling terminal and the power source member, a detecting member for turning on or off the switch according by detecting voltage value of the discharge voltage applied from the first or second coupling terminals, and a switching driving member connected to output side of the switch and for maintaining ON state of the switch when current is supplied to the power source member through the switch.

Also, the switch comprises triac.

Also, the detecting member comprises two or more neon lamps which are connected in series.

Also, the switching driving member comprises a first bridge circuit connected in parallel to the detecting member, a photo coupler installed at the current path of the first bridge circuit, and a second bridge circuit electrically connected between the switch and the inside circuit and for turning on and off the photo coupler.

In the third aspect of the present invention, an electric shock protecting device which is used to a fluorescent lamp-compatible LED (Light Emitting Diode) lighting device having first and second coupling members connected to a fluorescent lamp apparatus, a power source member for producing driving power source by using the outside power source being inputted from the first and second coupling members, an LED module having plural LEDs, and a driving member for driving the LED module by using the driving power source of the power source member, the electric shock protecting device is installed between the first or second coupling members and the power source member, wherein the electric shock protecting device comprises:

first and second switches installed in series to the current path between the first or second coupling member and the power source member, first and second detecting members connected in series to the first or second coupling terminals and for turning on and off the first and second switches respectively according to the first and second discharge voltage applied from the first or second coupling terminals, and a switching driving member connected to output side of the second switch and for maintaining ON state of the first and second switches when current is supplied to the power source member through the second switch.

Also, the first and second switches comprise triac.

Also, the first and second detecting members comprise two or more neon lamps which are connected in series.

MODE FOR INVENTION

Hereinafter, embodiments according to the present invention will be described in detail with reference to the accompanying drawings. The embodiments are preferred embodiments of the present invention and do not limit the scopes of claims. This invention has been described in its presently contemplated best mode, and it is clear that it is susceptible to numerous modifications, modes and embodiments within the ability of those skilled in the art and without the exercise of the inventive faculty.

First, a basic concept will be explained.

Very large kinds of ballast stabilizers are used to fluorescent lamp apparatuses which were commercialized at present. Structures and operations of these ballast stabilizers are different with each other. Inventors of the present invention have studied the characteristics of many blast stabilizers and as a result, it is confirmed that ballast stabilizers produce and output different discharge voltages according to the combination states of fluorescent lamps to the fluorescent lamp apparatus. For example, a case of a ballast stabilizer to be used to power voltage of 220V will be described. As shown in FIG. 1. when a first coupling member and a second coupling member, that is, a first to fourth terminal pins 11 to 14 are entirely coupled with sockets 2 and 3, a first voltage, that is, approximately 600V voltage is applied to the sockets 2 and 3. In contrast, when terminal pins are only coupled to a socket (2 or 3), a second voltage, that is, approximately 500V voltage is applied to the socket.

In the present invention, the voltage between the first voltage and the second voltage is set as the reference voltage. When the outside voltage inputted through terminal pins of the fluorescent lamp-compatible LED lighting device is lower than the reference voltage, the current path between the first coupling member 21 and 22 and the second coupling member 23 and 24 is cut off, thereby preventing an electric shock accident of a worker from generating.

Figure 2:
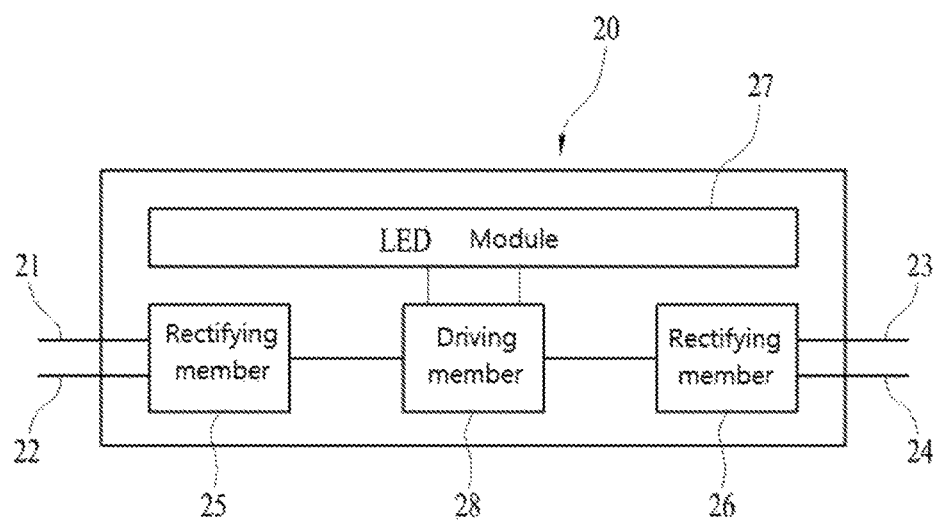
FIG. 2 is a construction view illustrating a construction of a general fluorescent lamp-compatible LED lighting device.
Figure 3:
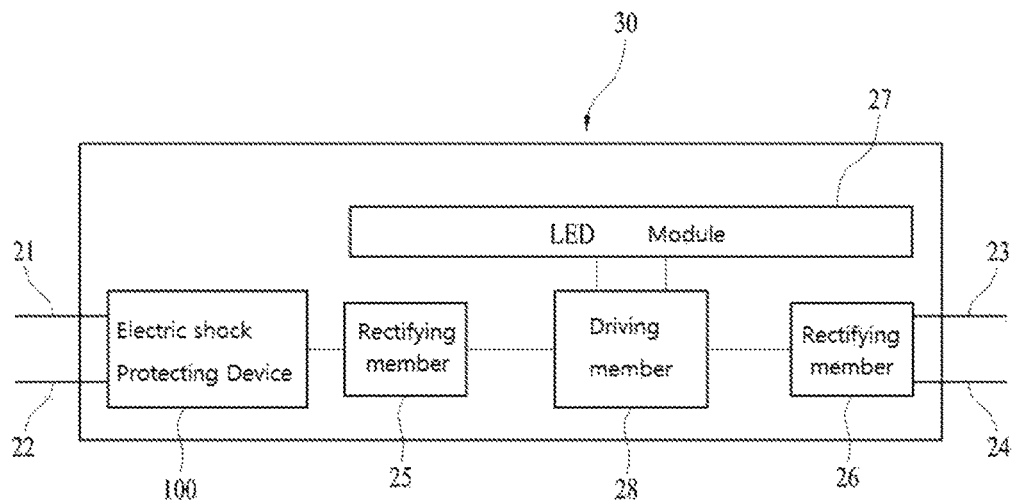
FIG. 3 is a construction view illustrating a construction of a fluorescent lamp-compatible LED lighting device according to the present invention.

FIG. 3 is a construction view illustrating a construction of a fluorescent lamp-compatible LED light device according to the present invention. In FIG. 3, the same reference numerals are given to the same parts as FIG. 2 which was described above and the detail description will be omitted.

In FIG. 3, an electric shock protecting device 100 is equipped with terminal pins which were located at a side of a fluorescent lamp-compatible LED lighting device 30. As shown in FIG. 3, the electric shock protecting device 100 is coupled to the first coupling member, that is, 21 and 22. However, the electric shock protecting device 100 can be coupled to the second coupling member, that is, 23 and 24 by the same method. The electric shock protecting device 100 detects the initial outside power source applied from the outside through the first coupling member and the second coupling member. Also, when the outside power source is lower than the reference voltage, the electric shock protecting device cuts off the power source path between the inside circuits. That is, only terminal pins which are located at a side of an LED lighting device are coupled to a socket (2 or 3) of the fluorescent lamp apparatus by the replacement work of the LED lighting device 30 and so on, and according to this, when unsuitable high voltage from a ballast stabilizer through the terminal pins of the LED lighting device 30 is applied, the electric shock protecting device cuts off the current path between the terminal pins and other terminal pins, so that an electric shock accident of a worker by the unsuitable high voltage is surely prevented.

Figure 4:
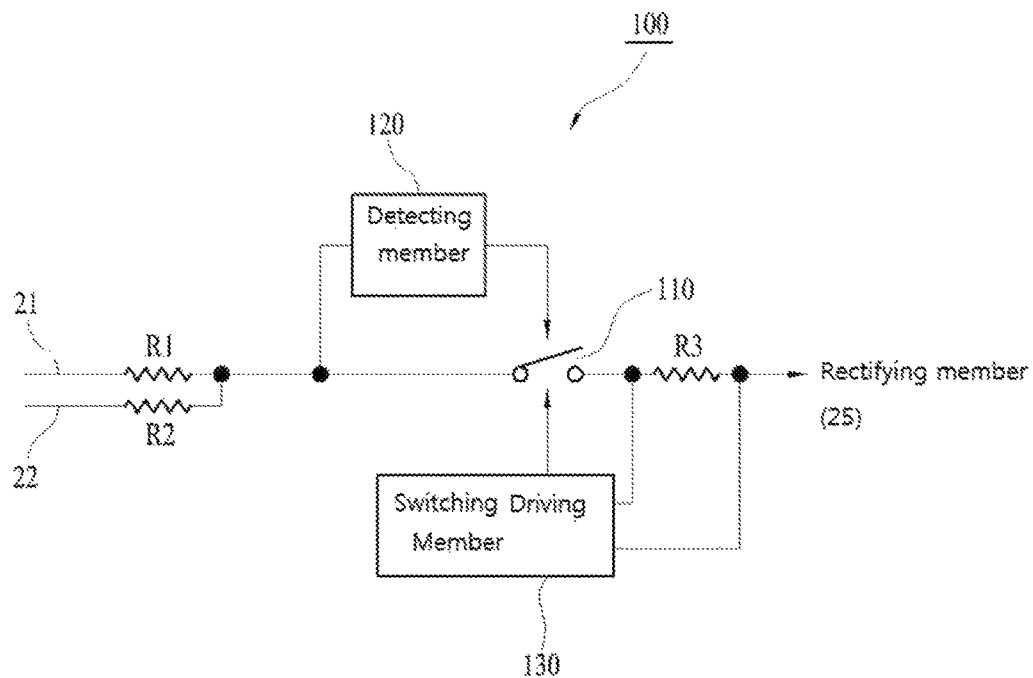
FIG. 4 is a block construction view illustrating a first construction example of an electric shock protecting device 100 of FIG. 3.

FIG. 4 is a block construction view illustrating a first construction example of an electric shock protecting device 100 of FIG. 3. As shown in FIG. 4, a switch 110 is installed between the terminal pins, which are located at a side of the LED lighting device 20, that is, the first coupling member and a rectifying member 25 in this embodiment. The switch 10 cuts off the current flow between the first coupling member and the rectifying member. Resistors R1 and R2 are coupled to the first and second terminal pins 21 and 22, respectively. The resistors R1 and R2 are set to have the resistance corresponding to a filament 15 of FIG. 1. The resistors are used for the following: a ballast stabilizer 4 can recognize that the fluorescent lamp 10 is combined with a socket 2 or 3.

On and off operations of the switch 110 are controlled by a detecting member 120 and a switching driving member 130. The detecting member 120 controls on and off of the switch 110 on the basis of the initial outside power source. As shown in FIG. 1, when a user turns on a power switch 6 of a fluorescent lamp apparatus, at the beginning, high voltage from a ballast stabilizer 4 is applied for the discharge of a fluorescent lamp. Also, at this time, the applied high voltage has the first or second voltage value according to a combination state of the LED lighting device 30 to the fluorescent lamp apparatus as described above. The detecting member 120 turns on the switch 110 when the initial outside voltage being applied from the first coupling member 21 and 22 is higher than the reference voltage.

A resistor R3 is installed between the switch 110 and the rectifying member 25 and a switching driving member 130 is equipped with both ends of the resistor R3. When the switch 110 is turned on and thus outside power source is supplied to the rectifying member 25 through the resistor R3, the switching driving member 130 outputs a switching driving signal to make the switch 110 maintain ON state.

According to the electric shock protecting device 100, as shown in FIG. 4, when high voltage which is higher than the reference voltage, that is, the normal discharge voltage, is applied from the ballast stabilizer 4, the switch 110 is turned on by the detecting member 120. And, by turning on the switch 110, when the outside power source is supplied to the rectifying member 25 through the resistor R3, the switching driving member 130 makes the switch 110 maintain ON state, so that the driving power source from the fluorescent lamp apparatus is normally supplied to the rectifying member 25.

On the other hand, by the replacement work of an LED lighting device 30 to the fluorescent lamp apparatus, when the first coupling member 21 and 22 is combined with a socket 2 or 3, and the second coupling member 23 and 24 not combined with a socket 2 or 3, since the initial outside power source flowing in through the first coupling member is lower than the reference voltage, the detecting member 120 makes the switch 110 maintain OFF state. And, by OFF of the switch 110, the current flow through the resistor R3 is also cut off, so that the switching driving member 130 is also set as non-driving state. Accordingly, in this case, the switch 110 is continuously maintained as OFF state and thus the first coupling member 21 and 22 and the inner circuit are set as open state, so that although a worker touches the second coupling member, the occurrence of an electric shock accident is prevented.

Also, when a worker performs a replacement work of an LED lighting device 20, in a case that the second coupling member 23 and 24 is combined with a socket 2 or 3, since any outside power source is not supplied to the first coupling member 21 and 22, the detecting member 120 is set as the non-operation state, so that the switch 110 is turned off. And, when the switch 110 is set as OFF state, since the current flow through the resistor R3 is cut off, the switching driving member 130 is also set as the non-operation state. Accordingly, also in this case, since the first coupling member 21 and 22 and the inner circuit are set as open state, so that although a worker touches the first coupling member, the occurrence of an electric shock accident is prevented.

Figure 5:
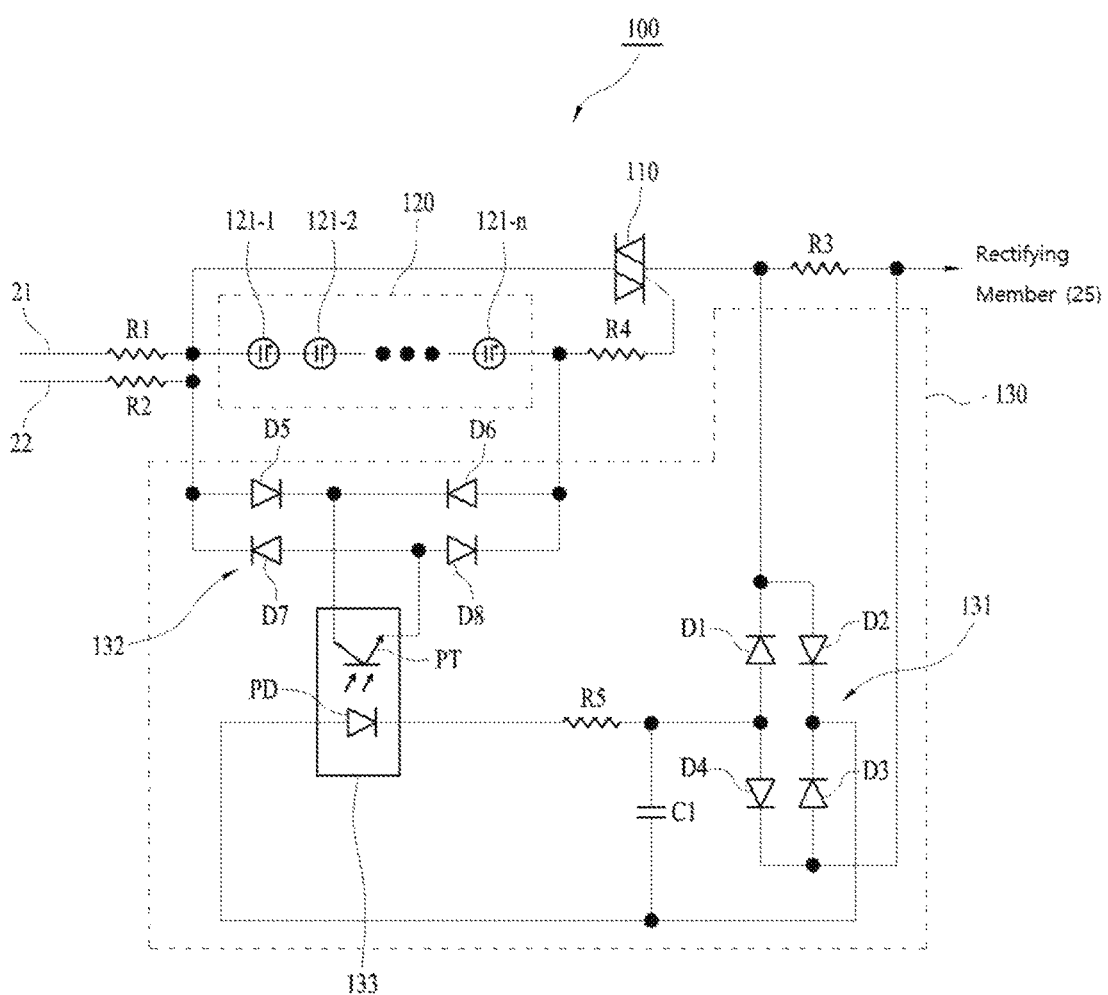
FIG. 5 is a real circuit construction view illustrating an electric shock protecting device 100 of FIG. 4.

FIG. 5 is a real circuit construction view illustrating an electric shock protecting device 100 of FIG. 4.

In this embodiment, a triac is used as a switch for cutting off current flow between the first and second terminal pins 21 and 22 and the rectifying member 35. Since the triac has very low parasite capacitance among semiconductor switches for cutting off current flow relatively, it is used preferably as the switch 110.

The detecting member 120, as shown in FIG. 4, consists of a plurality of neon lamps 121-1, 121-2, . . . 121-$n$ which were connected in series. As described above, electronic components such as a semiconductor device and the like have parasite capacitance and thus there is a problem that a leakage current occurred. And, as shown in FIG. 1, the existing fluorescent lamp is free from an electric shock accident and the like because the fluorescent lamp is a discharge lamp. That is, in the discharge lamp, current flow is produced only when it is turned on by discharge. When a discharge lamp is not turned on, it has parasite capacitance of approximately "0". In this embodiment, a neon lamp 121 for constructing a detecting member 120 is a discharge lamp which is the same as the fluorescent lamp. Thus, there is an advantage that the detecting member 120 can exclude the effect due to the leakage current.

As described above, discharge voltage supplied from a ballast stabilizer 4 is set as a first voltage with approximately 600V and a second voltage with approximately 500V according to the combination state of the fluorescent lamp. In a neon lamp with rated voltage 220V, its critical voltage is set as 90V. In FIG. 5, when a detecting member 120 is constructed by connecting six neon lamps 121 in series, the entire critical voltage of the detecting member 120 is set as approximately 540V. This is a proper value which can be used as a reference voltage to the first or second voltage supplied from the fluorescent lamp.

An output terminal of the detecting member 120 is combined with a gate electrode of a triac 110 through a bias resistor R4. In the drawing, in a case that the outside voltage being applied through the first and second terminal pins 21 and 22 is the first voltage, for example, 600V, the neon lamp 121 for constructing the detecting member 120 is turned on and thus the outside power source is applied to a gate electrode of the triac 110. Accordingly, in this case, the triac 110 is turned on and thus the first and second terminal pins 21 and 22 and the rectifying member 25 are electrically connected.

On the other hand, when the outside voltage applied through the first and second terminal pins 21 and 22 is the second voltage, for example, 500V, the neon lamp 121 for constructing the detecting member 120 is maintained as OFF state and thus the triac 110 is set as OFF state. Accordingly, in this case, the first and second terminal pins 21 and 22 and the rectifying member 25 are set as open state.

The switching driving member 130 comprises a first bridge circuit 131 combined with both ends of resistor R3, a second bridge circuit 132 combined in parallel to the detecting member 121, a photo coupler 133 for cutting off the current path of the second bridge circuit 132. A charge and discharge capacitor C1 is combined with both ends of a photo diode PD of the photo coupler 133.

The first bridge circuit 131 comprises diodes D1 to D4, and the second bridge circuit 132 comprises diodes D5 to D8. A photo transistor PT of the photo coupler 133 is combined with the current path of the second bridge circuit 132, and anode of the photo diode PD of the photo coupler 133 is combined with the first bridge circuit 131 and cathode thereof is combined with the first bridge circuit 131 through resistor R5.

In the switching driving member 130, when the triac 110 is turned on and thus current flows through resistor R3, current is supplied to the photo diode 133 through the first bridge circuit 131 by voltage difference between both ends of the resistor R3 and thus photo transistor PT is turned on. And, when the photo transistor PT is turned on, gate voltage is supplied continuously to the triac 110 through diodes D5 and D8 of the second bridge circuit 132 from the first and second terminal pins 21 and 22. That is, as described in FIG. 1, in the fluorescent lamp apparatus, when a power source switch 6 is turned on, discharge voltage of high voltage is supplied to the fluorescent lamp 110 by a ballast stabilizer 4 at the initial operation, and then when the fluorescent lamp 110 is turned on, stable driving power source is supplied to the fluorescent lamp through sockets 2 and 3.

In the construction of FIG. 5, the power switch 6 of the fluorescent lamp is turned on and thus when discharge voltage of high voltage from the fluorescent lamp apparatus is applied, a triac 110 is turned on by the detecting member 120 and then the outside power source is supplied to the rectifying member 25 from the first and second terminal pins 21 and 22, and at this time, the photo coupler 133 of the switching driving member 130 is driven and thus the triac 110 is maintained as ON state stably. And by this flow of the power source, when stable driving power source, that is, alternating power source is supplied through the first coupling member and the second coupling member from the fluorescent lamp apparatus, the driving power source is supplied to the rectifying member 25 stably through the triac 110.

In FIG. 5, a capacitor C1 is used for driving stably the photo coupler 133. The LED lighting device is driven by alternating current. In a normal operating state, power source current being supplied from the fluorescent lamp apparatus flows alternately by constant period between the first coupling member 21 and 22 and the second coupling member 23 and 24. When driving current is supplied from the first bridge circuit 131 to the photo diode PD, the capacitor C1 is charged by the driving current. And, at a time period that driving current is not supplied to the photo diode PD from the first bridge circuit 131 by the period of zero crossing point of alternating current power, the capacitor C1 is discharged and thus its discharge current is supplied to photo diode PD as driving current. Accordingly, the photo coupler 133 is driven regardless of the zero crossing point of alternating current power and thus the first bridge circuit 132 is always set stably as a driving state.

Accordingly, in FIG. 5, when the outside power source flows from a first coupling member 21 and 22 to a second coupling member 23 and 24, a driving power source being inputted from the first coupling member 21 and 22 is supplied to the gate of the triac 110 through a diode D5, a photo transistor PT, and a diode D8 of a second bridge circuit 132, so that the triac 110 is set as ON state and thus driving power source is supplied to the rectifying member 25 through main electrode of the triac 110. Also, when the outside power source flows from the second coupling member 23 and 24 to the first coupling member 21 and 22, a current path continuing to the first coupling member 21 and 22 is formed through the rectifying member 25, resistor R3, main electrode and a gate electrode of triac 110, resistor R4, diode D6, photo transistor PT, and diode D7, so that the triac 110 is set as ON state and thus the driving power source flows from the rectifying member 25 to the first coupling member 21 and 22 through main electrode of the triac 110

The above operation continued until the driving power source flowing through the first and second terminal pins 21 and 22 is cut off by turning off a power switch 6 of the fluorescent lamp apparatus.

Figure 6:
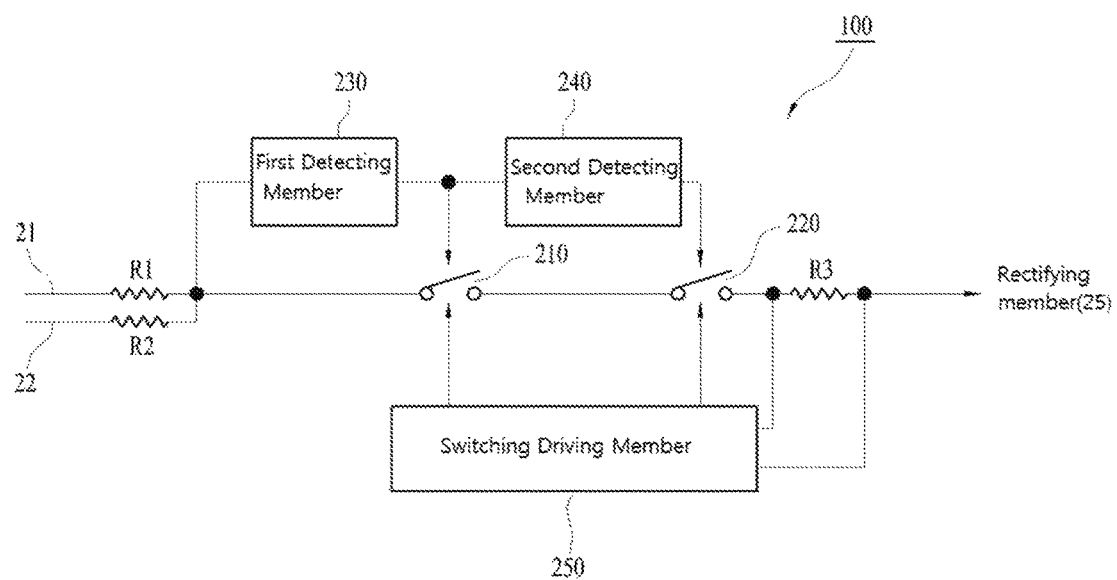
FIG. 6 is a block construction view illustrating a second construction example of an electric shock protecting device 100 of FIG. 3.

FIG. 6 is a block construction view illustrating a second construction example of an electric shock protecting device 100 of FIG. 3. In this embodiment, the first and second switch 210 and 220 are installed in series between the first and second terminal pins 21 and 22 and a rectifying member 25. These first and second switches 210 and 220 are turned on and off by first detecting member 230 and second detecting member 240 respectively. Also, a switching driving member 250 outputs a switching driving signal when the switches 210 and 220 are turned on and thus the outside power source is supplied to the rectifying member 25 through resistor R3, so that the switch 110 is maintained as ON state.

As described above, electronic components such as a semiconductor and the like have parasite capacitance. As it is well-known, the capacitance of capacitor and the like become low largely when plural capacitors are connected in series. As shown in FIG. 4 and FIG. 5, the triac constructing the switch 110 has constant parasite capacitance, which is relatively very low though. In the present construction embodiment, the switches being constructed by triac are connected by multi-stage in series, so that the entire parasite capacitance by switches 210 and 22 can lower more.

Figure 7:
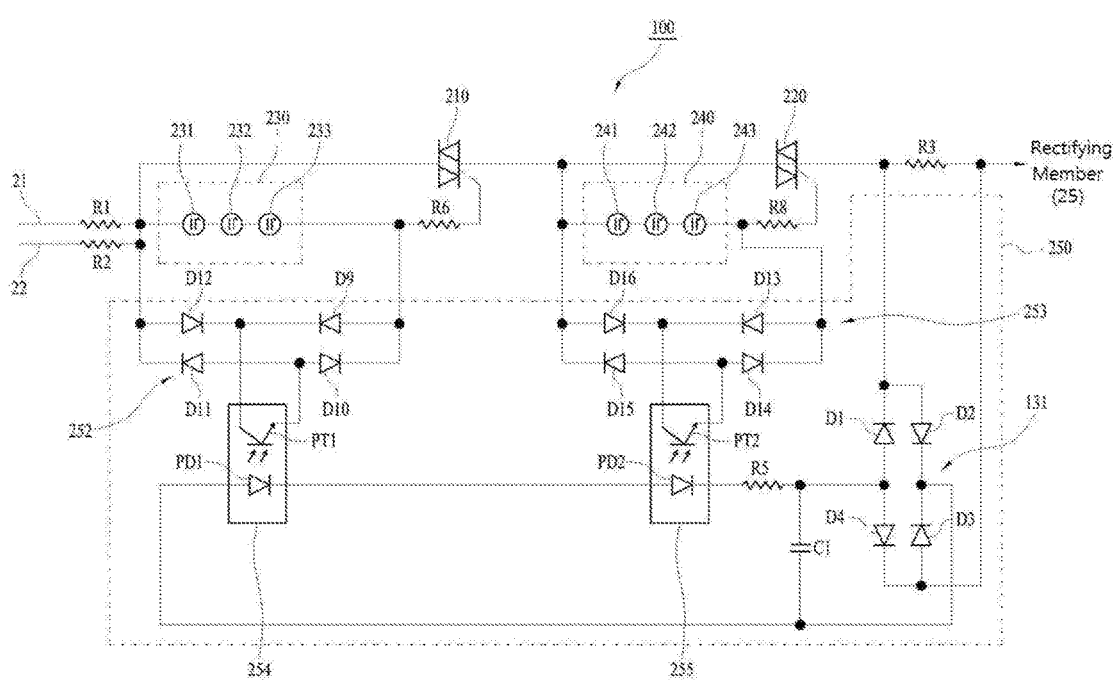
FIG. 7 is a real circuit construction view illustrating an electric shock protecting device 100 of FIG. 6.

FIG. 7 is a real circuit construction view illustrating an electric shock protecting device 100 of FIG. 6. In FIG. 7, the substantially same reference numerals are used at the same parts and its detailed description will be omitted. As shown in FIG. 7, first triac 210 and second triac 220 are installed between the first and second terminal pins 21 and 22 and the rectifying member 25. The first triac 210 and the second triac 220 are driven as ON/OFF by the first and second detecting members 230 and 240 respectively. The first detecting member 230 comprises the first to three neon lamps 231 to 233 connected in series. The second detecting member 240 comprises the fourth to sixth neon lamps 241 to 243 connected in series. Also, the first detecting member 230 and the second detecting member 240 are connected in series through current path between gate electrode and main electrode of the first triac 110. Accordingly, in the present construction, the entire reference voltage set by the first and second detecting members 230 and 240 is substantially the same as that of FIG. 4 and FIG. 5. That is, in this embodiment, the reference voltage to discharge voltage being applied from the fluorescent lamp apparatus is maintained as it is and triacs 210 and 220 are connected in series by multi-stage, so that parasite capacitance set by triacs 210 and 220 become lowered.

And, a third bridge circuit 252 is connected in parallel to the first detecting member 230 and fourth bridge circuit 253 connected in parallel to the second detecting member 240. A second photo coupler 254 is installed at current path of the third bridge circuit 252 and a third photo coupler 255 installed at current path of the fourth bridge circuit 253. These second and third photo couplers 254 and 255 are driven by the first bridge circuit 131. The construction and operation of the switching driving member 250 are substantially same as FIG. 5, so that its detailed description will be omitted. This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

For example, in the above embodiments, although triacs are used as switches 110, 210 and 220 of FIG. 4 and FIG. 6, other switches with low parasite capacitance can be used as switches for the same purpose.

The invention claimed is:

1. A fluorescent lamp-compatible LED (Light Emitting Device) lighting device which is used to a fluorescent lamp apparatus and includes a ballast stabilizer which applies a first discharge voltage when first and second coupling terminals of the fluorescent lamp are all connected to the fluorescent lamp apparatus and also applies second discharge voltage when first coupling terminal or second coupling terminal is connected to the fluorescent lamp apparatus, the fluorescent lamp-compatible LED light device comprising;
first and second coupling members electrically connected to sockets of both sides of the fluorescent lamp apparatus,
an electric shock protecting device selectively connected to the first coupling member or the second coupling member,
a rectifying member for rectifying the outside alternating power source inputted through the first and second coupling members,
an LED module having plural LEDs, and
a driving member for driving the LED module based on the driving power source supplied from the rectifying member,
wherein the electric shock protecting device electrically connects the first coupling member or the second coupling member to an inside circuit when the first discharge voltage is applied from the fluorescent lamp apparatus, and sets the first coupling member or the second coupling member as open state to the inside circuit when the second discharge voltage is applied from the fluorescent lamp apparatus.

2. The fluorescent lamp-compatible LED light device according to claim 1, wherein the electric shock protecting device comprises:
a first switch for switching electrical connection between the first coupling terminal or the second coupling terminal and the inside circuit,
a first detecting member for turning on or off the first switch according to the first and second discharge voltage from the first or second coupling terminals, and
a first switching driving member connected to output side of the first switch and for maintaining ON state of the first switch when current is supplied to the inside circuit through the first switch.

3. The fluorescent lamp-compatible LED light device according to claim 2, wherein the first switch comprises triac.

4. The fluorescent lamp-compatible LED light device according to claim 2, wherein the first detecting member comprises two or more neon lamps which are connected in series.

5. The fluorescent lamp-compatible LED light device according to claim 1, the first switching driving member comprises a first bridge circuit connected in parallel to the detecting member, a first photo coupler installed at the current path of the first bridge circuit, and a second bridge circuit electrically connected between the first switch and the inside circuit and for turning on and off the first photo coupler.

6. The fluorescent lamp-compatible LED light device according to claim 1, wherein the electric shock protecting device comprises second and third switches installed in series to the current path between the first or second coupling member and the inside circuit, second and third detecting members connected in series to the first or second coupling terminals and for turning on and off the second and third switches respectively according to the first and second discharge voltage applied from the first or second coupling terminals, and a switching driving member connected to output side of the second switch and for maintaining ON state of the second and third switches when current is supplied to the inside circuit through the second switch.

7. The fluorescent lamp-compatible LED light device according to claim 6, wherein the second and third switches comprise triac.

8. The fluorescent lamp-compatible LED light device according to claim 6, wherein the second and third detecting members comprise two or more neon lamps which are connected in series.

9. The fluorescent lamp-compatible LED light device according to claim 6, the second switching driving member comprises third and fourth bridge circuits connected in parallel respectively to the second and third detecting members, second and third photo couplers installed at the current path of the third and fourth bridge circuits, and a fifth bridge circuit electrically connected between the second switch and the inside circuit and for turning on and off the second and third photo couplers.

10. An electric shock protecting device which is used to a fluorescent lamp-compatible LED (Light Emitting Diode) lighting device having first and second coupling members connected to a fluorescent lamp apparatus, a power source member for producing driving power source by using the outside power source being inputted from the first and second coupling members, an LED module having plural LEDs, and a driving member for driving the LED module by using the driving power source of the power source member, the electric shock protecting device is installed between the first or second coupling members and the power source member, wherein the electric shock protecting device comprises:
a switch for switching electrical connection between the first coupling terminal or the second coupling terminal and the power source member,
a detecting member for turning on or off the switch according by detecting voltage value of the discharge voltage applied from the first or second coupling terminals, and a switching driving member connected to output side of the switch and for maintaining ON state of the switch when current is supplied to the power source member through the switch.

11. The electric shock protecting device according to claim 10, wherein the switch comprises triac.

12. The electric shock protecting device according to claim 10, wherein the detecting member comprises two or more neon lamps which are connected in series.

13. The electric shock protecting device according to claim 10, the switching driving member comprises a first bridge circuit connected in parallel to the detecting member, a photo coupler installed at the current path of the first bridge circuit, and a second bridge circuit electrically connected between the switch and the inside circuit and for turning on and off the photo coupler.

14. An electric shock protecting device which is used to a fluorescent lamp-compatible LED (Light Emitting Diode) lighting device having first and second coupling members connected to a fluorescent lamp apparatus, a power source member for producing driving power source by using the outside power source being inputted from the first and second coupling members, an LED module having plural LEDs, and a driving member for driving the LED module by using the driving power source of the power source member, the electric shock protecting device is installed between the first or second coupling members and the power source member, wherein the electric shock protecting device comprises:

first and second switches installed in series to the current path between the first or second coupling member and the power source member, first and second detecting members connected in series to the first or second coupling terminals and for turning on and off the first and second switches respectively according to the first and second discharge voltage applied from the first or second coupling terminals, and a switching driving member connected to output side of the second switch and for maintaining ON state of the first and second switches when current is supplied to the power source member through the second switch.

15. The electric shock protecting device according to claim 14, wherein the first and second switches comprise triac.

16. The electric shock protecting device according to claim 14, wherein the first and second detecting members comprise two or more neon lamps which are connected in series.

* * * * *